United States Patent
Wheatley

(10) Patent No.: US 9,785,398 B2
(45) Date of Patent: Oct. 10, 2017

(54) SYSTEMS AND METHODS FOR AUTOMATICALLY ADJUSTING VOLUME OF A MEDIA ASSET BASED ON NAVIGATION DISTANCE

(71) Applicant: Rovi Guides, Inc., Santa Clara, CA (US)

(72) Inventor: David John Wheatley, Tower Lakes, IL (US)

(73) Assignee: Rovi Guides, Inc., San Carlos, CA (US)

( * ) Notice: Subject to any disclaimer, the term of this patent is extended or adjusted under 35 U.S.C. 154(b) by 172 days.

(21) Appl. No.: 14/224,252

(22) Filed: Mar. 25, 2014

(65) Prior Publication Data
US 2015/0277850 A1  Oct. 1, 2015

(51) Int. Cl.
| | |
|---|---|
| G06F 15/00 | (2006.01) |
| G06F 13/00 | (2006.01) |
| G06F 3/16 | (2006.01) |
| G06F 3/0481 | (2013.01) |
| G06F 3/0483 | (2013.01) |
| G06F 3/0485 | (2013.01) |
| G06F 3/0484 | (2013.01) |
| H04N 21/00 | (2011.01) |
| H04N 21/472 | (2011.01) |
| H04N 21/482 | (2011.01) |
| H04N 21/81 | (2011.01) |

(52) U.S. Cl.
CPC ............ *G06F 3/165* (2013.01); *G06F 3/0483* (2013.01); *G06F 3/04812* (2013.01); *G06F 3/04847* (2013.01); *G06F 3/04855* (2013.01); *H04N 21/00* (2013.01); *H04N 21/472* (2013.01); *H04N 21/482* (2013.01); *H04N 21/8106* (2013.01)

(58) Field of Classification Search
CPC ......... G04H 60/31; H03G 3/3005; H03G 1/02
USPC ................ 715/716, 721, 863, 792, 783, 854
See application file for complete search history.

(56) References Cited

U.S. PATENT DOCUMENTS

| | | | |
|---|---|---|---|
| 5,880,768 A | 3/1999 | Lemmons et al. | |
| 5,940,073 A | 8/1999 | Klosterman et al. | |
| 6,147,715 A | 11/2000 | Yuen et al. | |
| 6,275,268 B1 | 8/2001 | Ellis et al. | |

(Continued)

FOREIGN PATENT DOCUMENTS

EP    0814414 A2    12/1997

OTHER PUBLICATIONS

Robi Struyf "Auto play on page load ± Auto stop when player is out of sight due scrolling" Oct. 15, 2012 Vimeo.com Forum (https://vimeo.com/forums/topic:77153).

*Primary Examiner* — Kevin Nguyen
(74) *Attorney, Agent, or Firm* — Haley Guiliano LLP

(57) ABSTRACT

Systems and methods for automatically adjusting volume of a media asset are provided. A display of a content navigation page is generated. The content navigation page is associated with a media asset. A navigation distance from a current position in the content navigation page to the media asset within the content navigation page is determined. The navigation distance is cross-referenced with a database of volume levels associated with navigation distances to identify a volume level that is associated with the navigation distance. Audio of the media asset is caused to be presented at the identified volume level.

22 Claims, 8 Drawing Sheets

(56) References Cited

U.S. PATENT DOCUMENTS

| | | | |
|---|---|---|---|
| 6,898,762 B2* | 5/2005 | Ellis | H04H 60/31 |
| | | | 348/E7.063 |
| 2006/0259877 A1* | 11/2006 | Kaminagayoshi | G06F 3/165 |
| | | | 715/858 |
| 2008/0025529 A1* | 1/2008 | Keohane et al. | G06F 3/165 |
| | | | 381/104 |
| 2012/0051560 A1* | 3/2012 | Sanders | H03G 1/02 |
| | | | 381/105 |
| 2014/0176813 A1 | 6/2014 | Conness et al. | |
| 2014/0240595 A1* | 8/2014 | DiNunzio | H03G 3/3005 |
| | | | 348/484 |

\* cited by examiner

600B

| Program Description<br>Family Guy<br>Channel | Navigation<br>Distance = 2 listings<br>Time | CBS |
|---|---|---|
| ▨▨▨ | 7 - 9 PM | 9 - 11 PM |
| NEWS | News at 7 PM | News at 9 PM |
| On-demand | Movie A | Movie B |
| HBO | Sex And The City | Sex And The City |
| MAX | Tyson | Tyson II |
| CBS | Family Guy | Friends |
| ⋮ | ⋮ | ⋮ |

644 — Navigation Distance = 2 listings
654 — CBS
660 — Volume = 60%
610 — (channel listings bracket)
620 — News at 7 PM
680 — ⋮

FIG. 6B

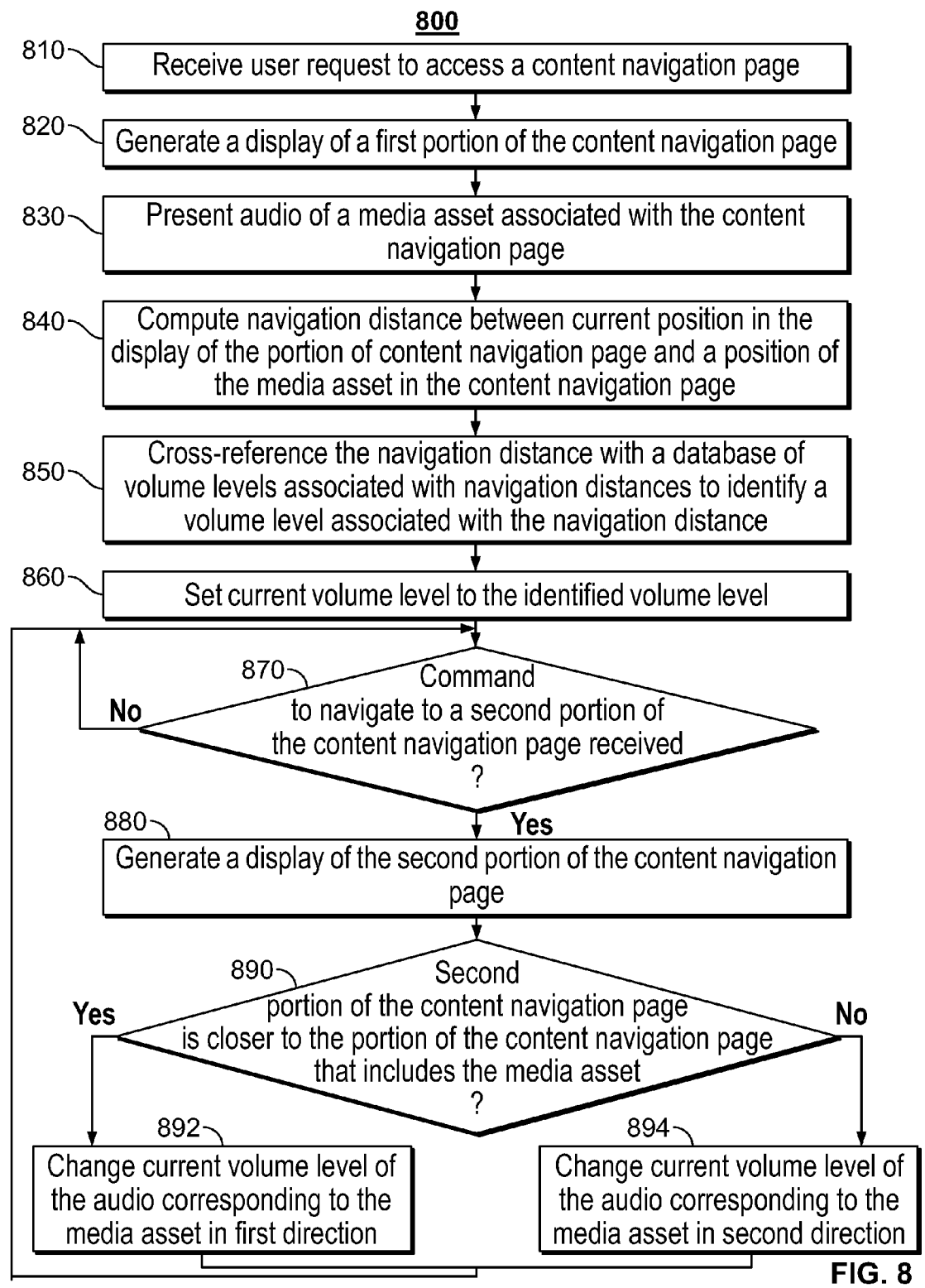

SYSTEMS AND METHODS FOR AUTOMATICALLY ADJUSTING VOLUME OF A MEDIA ASSET BASED ON NAVIGATION DISTANCE

BACKGROUND

Traditional media systems present audio of a video at a predetermined volume while the user browses a webpage. In some cases, the user may be browsing a different part of the webpage that is not showing the video while audio of the video continues to be output. The large size of such webpages oftentimes makes it difficult for the user to find the video corresponding to the audio being output on the webpage. As such, in these systems a user that wishes to see the video corresponding to the audio being output has to endure the tedious task of scrolling through the entire webpage until the corresponding video is displayed.

SUMMARY

In view of the foregoing, systems and methods for automatically adjusting volume of a media asset based on navigation distance are provided. Specifically, the systems and methods increase volume of audio of a media asset that is provided on a content navigation page as the user navigates through the content navigation page closer and closer to the media asset. Similarly, the systems and methods decrease the volume of the audio of the media asset as the user navigates through the content navigation page further and further away from the media asset.

In some embodiments, a display of a content navigation page is generated. The content navigation page may be associated with a media asset. In some embodiments, the media asset may include a promotion or advertisement. A navigation distance from a current position in the content navigation page to the media asset within the content navigation page may be determined. The navigation distance may be cross-referenced with a database of volume levels associated with navigation distances to identify a volume level that is associated with the navigation distance. Audio of the media asset may be presented at the identified volume level.

In some embodiments, the user may request to access a webpage. The webpage may include a media asset that is automatically played when the webpage is displayed. The media asset may or may not be displayed in the part of the webpage that is displayed. However, audio of the media asset may be output regardless or independently of whether the media asset itself is displayed. A media guidance application may determine a navigation distance from a current position to the position in the webpage of the media asset. In some implementations, the navigation distance may be a function of an area between a current position indicator and an indicator of where the media asset is (e.g., the area in a scroll bar). The function may be a ratio of the area between the current position indicator and the indicator and the total area available (e.g., the total area of the scroll bar). In some implementations, the navigation distance may be a function of a number of user inputs required to navigate to a portion of the webpage that includes the media asset from the current portion of the webpage that is displayed.

In some embodiments, the user may request to access a display of media asset listings (e.g., a guide display). The guide display may include a media asset that is automatically played when the guide display is displayed (e.g., a media asset displayed in a picture-in-picture window). A media asset listing corresponding to the displayed media asset may or may not be displayed in the part of the guide display that is displayed. However, audio of the media asset may be output regardless or independently of whether the media asset listing itself is displayed. A media guidance application may determine a navigation distance from a current position to the position in the guide display of the media asset listing of the media asset being displayed. In some implementations, the navigation distance may be a function of a number of other media asset listings that are positioned between a currently highlighted media asset listing and the media asset listing of the media asset being presented. In some implementations, the navigation distance may be a function of a number of user inputs required to navigate to a portion of the guide display that includes the media asset listing from the currently highlighted media asset listing in the guide display that is displayed.

The media guidance application may retrieve a volume level that is associated with the computed navigation distance from a database. The media guidance application may adjust the volume of the automatically played media asset to match the identified volume level associated with the computed navigation distance.

In some embodiments, in response to receiving input from the user, the media guidance application may navigate from a current position in the content navigation page to a second portion of the content navigation page that includes a display of at least a portion of the media asset. A display of the second portion of the content navigation page with the at least the portion of the media asset may be generated. Audio of the media asset may be presented at a different volume level that is greater than the identified volume level. In particular, the media guidance application may compute a new navigation distance to the media asset or media asset listing based on the second portion of the content navigation page to which the user navigated. When the new navigation distance is smaller than the previously computed navigation distance (e.g., when the user has navigated to a position that is closer to the media asset or media asset listing), the media guidance application may increase the volume level of the audio of the media asset. When the new navigation distance is greater than the previously computed navigation distance (e.g., when the user has navigated to a position that is farther away from the media asset or media asset listing), the media guidance application may decrease the volume level of the audio of the media asset.

BRIEF DESCRIPTION OF THE DRAWINGS

The above and other features of the present invention, its nature and various advantages will be more apparent upon consideration of the following detailed description, taken in conjunction with the accompanying drawings, and in which:

FIGS. 6A and 6B are diagrams of interactive content navigation page displays in accordance with some embodiments of the disclosure; and FIGS. 7 and 8 are flow diagrams describing processes of automatically adjusting volume of a media asset based on navigation distance in accordance with some embodiments of the disclosure.

DETAILED DESCRIPTION OF EMBODIMENTS

Figure 1:
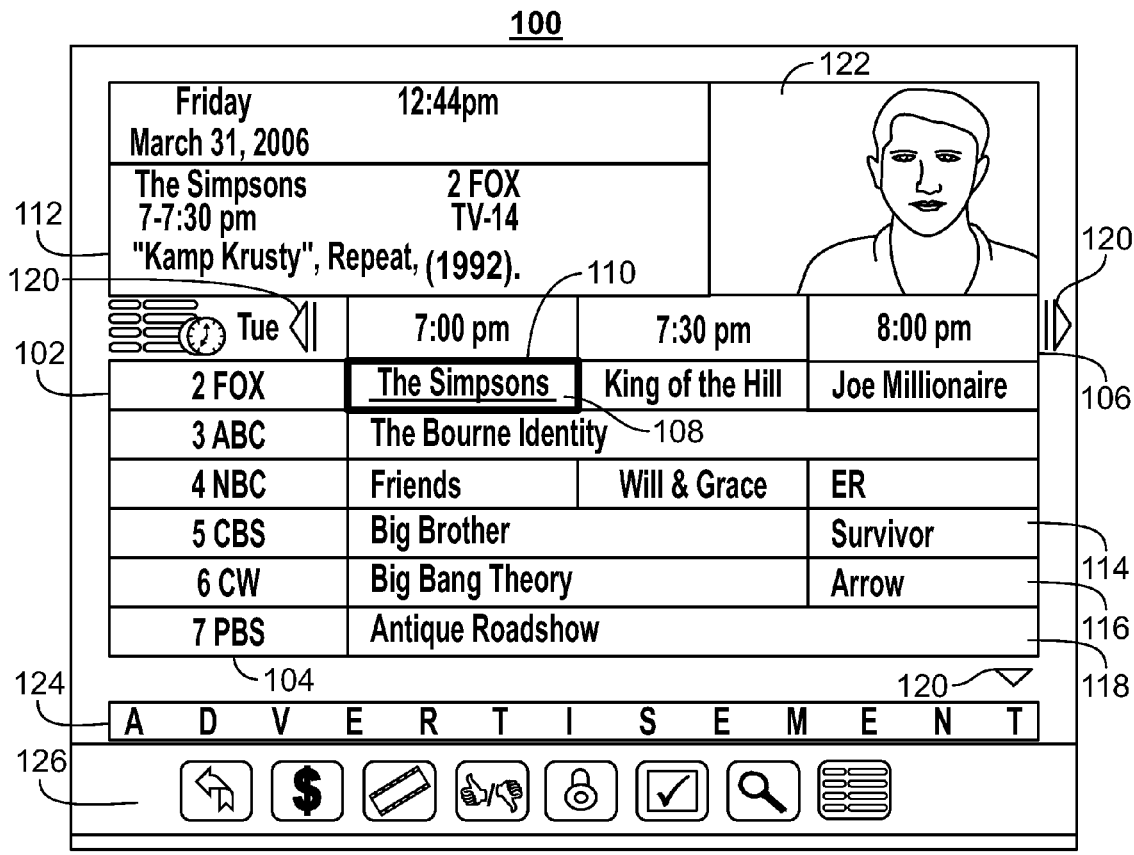
FIG. 1 is a diagram of an interactive grid display in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application. The media guidance application generates content navigation pages that represent different content and options of the media guidance application. These content navigation pages are sometimes referred to herein as displays of the media guidance application or displays of a content navigation page.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens (or content navigation pages) that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, webpages, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens.

In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below. The media guidance applications, when provided as on-line applications (i.e., provided on a website), generate content navigation pages in the form of webpages. These content navigation pages are displayed to the user on a corresponding user equipment device that is accessing the webpage through the website.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, subject matter information, and any other type of guidance data that is helpful for a user to navigate among and locate desired content selections.

Figure 2:
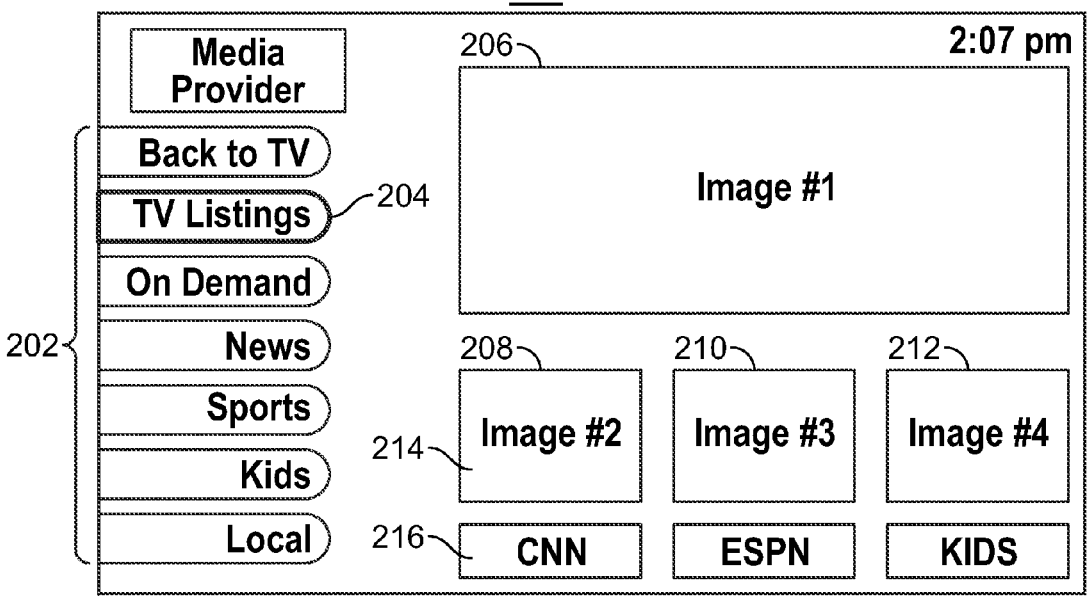
FIG. 2 is a diagram of an interactive media system in accordance with some embodiments of the disclosure.

FIGS. 1-2 show illustrative display screens that may be used to provide media guidance data. The display screens shown in FIGS. 1-2, 5 and 6 may be implemented on any suitable user equipment device or platform. While the displays of FIGS. 1-2, 5 and 6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available or media asset characteristics; and (2) a row of time identifiers 106, where each time identifier (which is a cell in the row) identifies a time block of programming. The media asset characteristics indicated in column of channel/content type identifiers 104 may include any combination of criteria that identifies a plurality of media assets (e.g., content source of a respective one of the media assets, a content type of the respective one of the media assets, or a content category of the respective one of the media assets). Although grid 102 is a by time-channel grid, any other type of grid may be provided such that time is shown on one dimension and a media characteristic is shown on another. For example, grid 102 may be arranged so that time is shown as in grid 102 and the column of identifiers may represent categories of different media assets or types of content sources (e.g., satellite and Internet). In particular, instead of showing the different programs available on a given channel (e.g., channel 2, FOX) at various times, grid 102 may display different programs that are of the genre or category (comedy) at various times regardless of the source from which they are received.

Grid 102 also includes cells of program listings, such as program listing 108, where each listing provides the title of the program provided on the listing's associated channel and time. As referred to herein, the term "program" should be understood to be synonymous with "media" or "media asset". With a user input device, a user can select program listings by moving highlight region 110. Information relating to the program listing selected by highlight region 110 may be provided in program information region 112. Region 112 may include, for example, the program title, the program description, the time the program is provided, if applicable (e.g., the transmission time of the program), the channel the program is on or content source of the program (if applicable), the program's rating, and other desired information.

In addition to providing access to linear programming (e.g., content that is scheduled to be transmitted to a plurality of user equipment devices at a predetermined transmission time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g., FTP).

Grid 102 may provide media guidance data for non-linear programming including on-demand listings 114, recorded content listings 116, and Internet content listings 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.) Specifically, the user may navigate along the time dimension to later or earlier times using icons 120.

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Audio of the video shown in region 122 may be output through speakers at a given volume. For example, as discussed in connection with FIGS. 6A and 6B, audio of the video shown in region 122 may depend on a navigation distance between a current position and a position of the program listing for the video. The closer the user is in navigation distance to the corresponding program listing of the video, the louder or greater the volume. The further away the user is in navigation distance to the program listing, the lower the volume. Grid displays that include a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

As referred to herein, the phrase "navigation distance" means an actual measure of distance between one position and another, a number representing how many user interactions (e.g., user selections of a navigation command, such as a down or up arrow) are required to reach a given position from a current position, or any other measure of space between one position (e.g., a current position) and another position (e.g., a position relating to a media asset or media asset listing corresponding to audio currently being output). The phrase "navigation distance" is used interchangeably with the phrase "navigation proximity".

Advertisement 124 may provide an advertisement for content that, depending on a viewer's access rights (e.g., for subscription programming), is currently available for viewing, will be available for viewing in the future, or may never become available for viewing, and may correspond to, or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner-shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

In some embodiments, advertisement 124 may be a pop-up or displayed as an overlay on top of other content in a content navigation page. Advertisement 124 may include video and audio. Audio of advertisement 124 may continue to be output even though the overlay or pop-up in which advertisement 124 is included is not currently in the display. In particular, audio of advertisement 124 may continue to be output even though all or some of the images or video of advertisement 124 are not being shown.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include VOD options, parental control options, Internet options, volume control options, cloud-based options, device synchronization options, second screen device options, options to access various types of media guidance data displays, options to subscribe to a premium service, options to edit a user's profile, options to enable/disable automatic adjustment of volume levels based on navigation distance/proximity, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, automatic dynamic volume rate change control, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200, the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
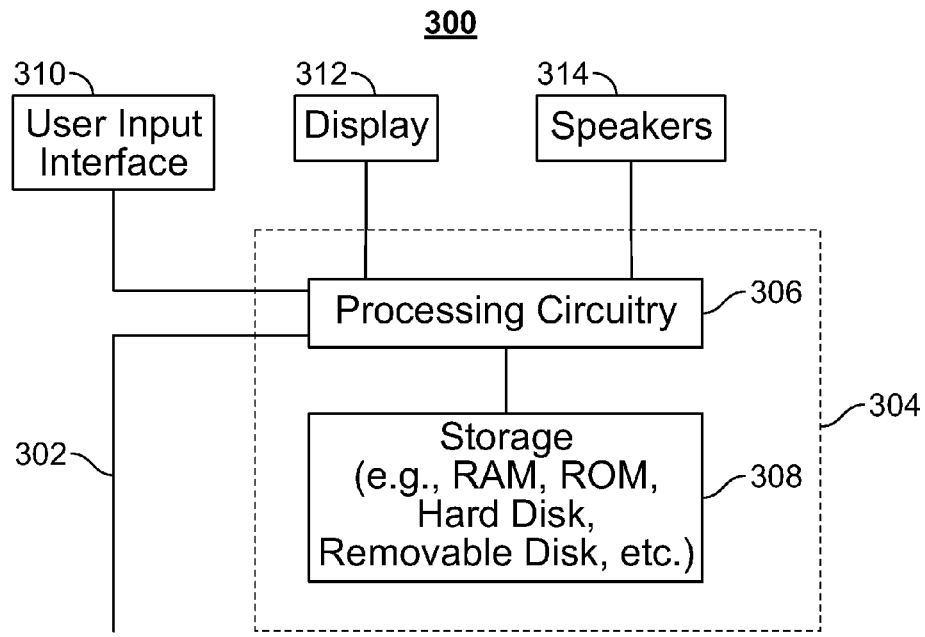
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiples of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data and guidance application data that are described above. For example, storage 308 may store a database of volume levels associated with navigation distances. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

Control circuitry 304 may include dynamic/automatic volume rate adjustment circuitry (not shown). The dynamic/automatic volume rate adjustment circuitry may adjust automatically the rate at which volume is changed based on a content navigation distance between a current position and content (e.g., video of a media asset or media asset listing) associated with audio currently being output. The dynamic volume rate adjustment circuitry may identify a media asset corresponding to audio currently being output. The dynamic volume rate adjustment circuitry may determine a position in the content navigation page of the identified media asset. In some implementations, the position may represent a numerical position in a grid display of a media asset listing for the media asset. In some implementations, the position may identify the coordinates of the center of the image of the media asset in the content navigation page. In some implementations, the position may identify a position of the image or video of the media asset relative to a top of the content navigation page. The image or video of the media asset may or may not be currently shown in the display while the audio is being output.

The dynamic volume rate adjustment circuitry may identify a current navigation position within the content navigation page. In some implementations, the current navigation position may represent a numerical position in a grid display of the cursor (e.g., which media asset listing is the cursor currently positioned over). In some implementations, the current navigation position may identify the coordinates of the cursor in the content navigation page. In some implementations, the current navigation position may identify which portion of a content navigation page is being viewed relative to a top of the content navigation page.

The dynamic volume rate adjustment circuitry may compare the current navigation position with the position of the media asset for which audio is being output. Based on the comparison, the dynamic volume rate adjustment circuitry may determine a navigation distance between the current position and the position of the media asset. The dynamic volume rate adjustment circuitry may cross-reference a database of volume levels associated with navigation distances (e.g., stored in storage 308) to identify a volume level for the media asset. The dynamic volume rate adjustment circuitry may automatically adjust the volume of the audio of the media asset being output to correspond to or match the identified volume level. The dynamic volume rate adjustment circuitry may monitor for user inputs navigating about the content navigation page. Each time the user navigates about the content navigation page, the dynamic volume rate adjustment circuitry may recompute the navigation distance between the current position and the position of the media asset in the content navigation page. The dynamic volume rate adjustment circuitry may continuously adjust the volume to increase or decrease the volume level based on the distance between the current position and the position of the media asset corresponding to the audio being output.

In some embodiments, the dynamic volume rate adjustment circuitry may increase the volume level as the navigation distance between the current position and the media asset position decreases. The dynamic volume rate adjustment circuitry may decrease the volume level as the navigation distance between the current position and the media asset position increases. In some embodiments, the dynamic volume rate adjustment circuitry may decrease the volume level as the navigation distance between the current position and the media asset position increases. The dynamic volume rate adjustment circuitry may increase the volume level as the navigation distance between the current position and the media asset position decreases.

As referred to herein the phrase "volume level" refers to how loud or soft the sound corresponding to a media asset is being output through speakers or headphones. The volume may be expressed as a percentage of the maximum possible amount or as a decibel level. For simplicity, this disclosure refers to the volume level as a percentage.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
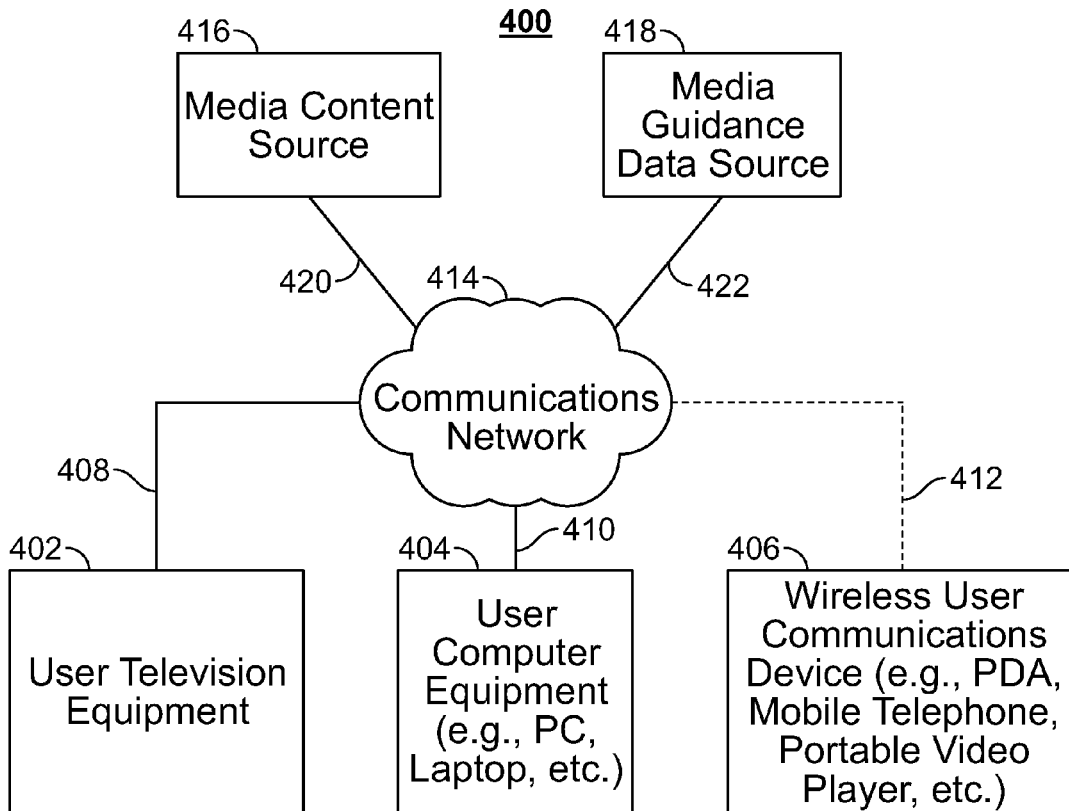
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, target volume levels, volume thresholds, volume adjustment rates, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired).

Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11 x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412.

Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct control circuitry 304 to generate the guidance application displays and transmit the generated displays to the user equipment devices. The server application may instruct control circuitry 304 of the media guidance data source 418 to transmit data for storage on the user equipment. The client application may instruct control circuitry 304 of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same type. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, the media guidance application may generate a display of a content navigation page that includes a webpage. The webpage may include a media asset that may or may not be in the current page display of the content navigation page. Independently of whether or not the media asset is shown in the page, audio of the media asset may be output. The media guidance application may adjust the volume level of the media asset audio based on a current position the user is viewing in the content navigation page relative to a position in the content navigation page of the media asset. In particular, as the user navigates closer to the media asset to bring the media asset into the display, the media guidance application may increase the volume level. As the user navigates farther away from the media asset being displayed in the content navigation page display, the media guidance application may decrease or reduce the volume level.

Figure 5A:
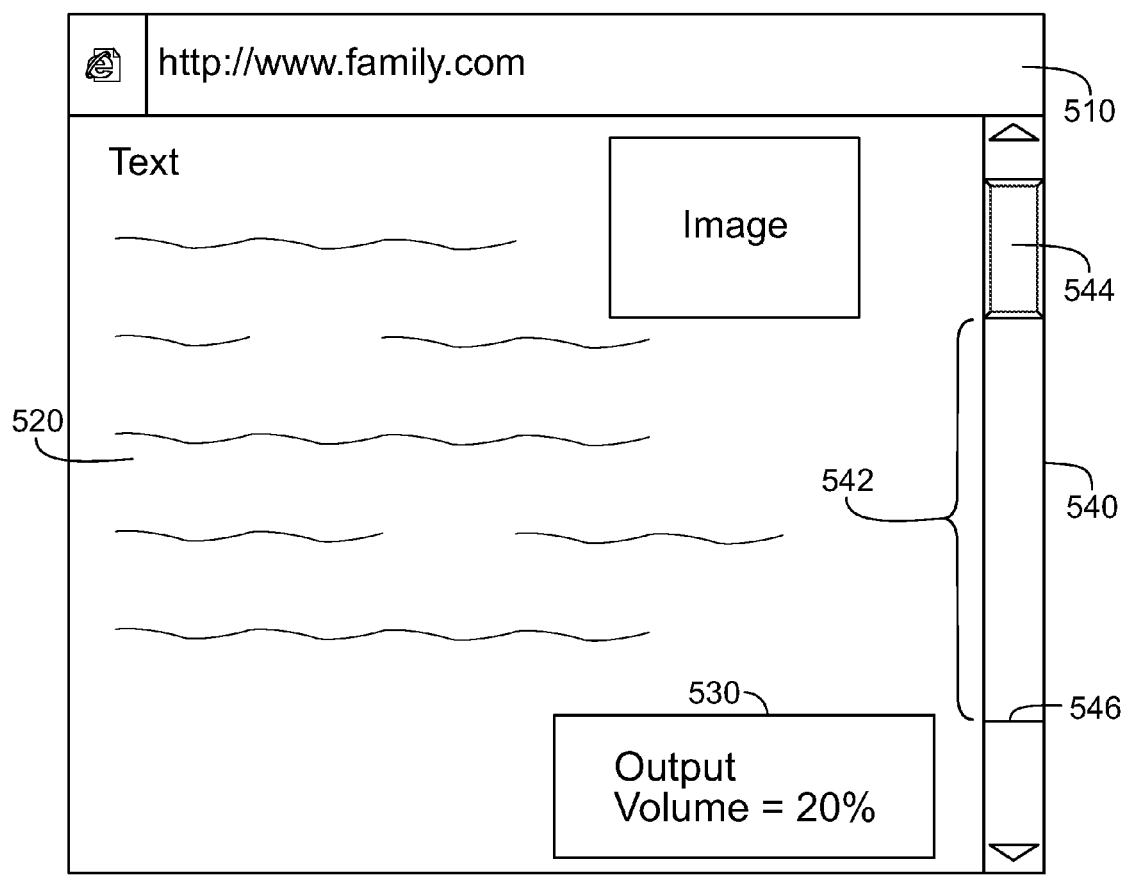
FIGS. 5A and 5B are diagrams of interactive content navigation page displays in accordance with some embodiments of the disclosure.
Figure 5B:
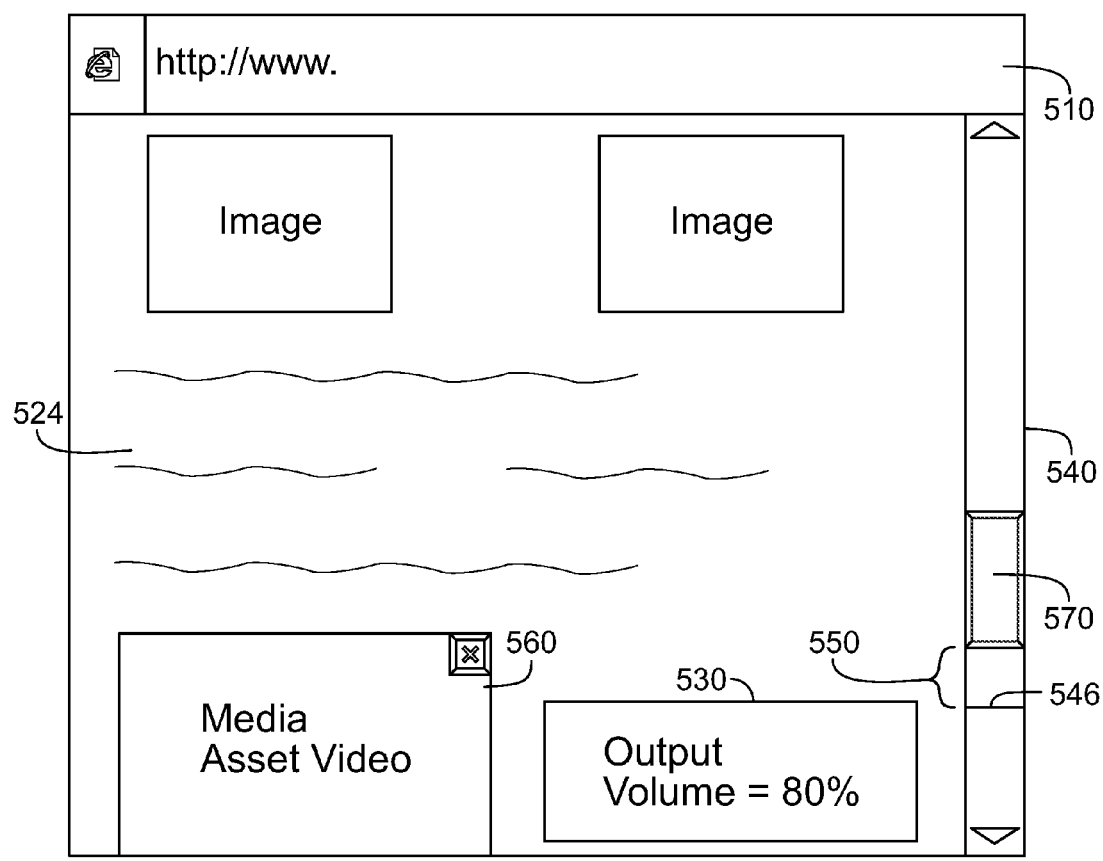

FIGS. 5A and 5B are diagrams of interactive content navigation page displays 500A and 500B in accordance with some embodiments of the disclosure. Interactive content navigation page displays 500A and 500B may represent a webpage of a website the user navigated to using user equipment 300. In some embodiments, display 500A may include an address region 510, content region 520, volume level region 530 and scroll region 540. Address region 510 may identify the website address from which the content navigation page display is received. For example, address region 510 may include a uniform resource locator (URL) of the website. In response to the user entering a URL in address region 510, the media guidance application may retrieve a webpage from a website at the address in region 510 and generate a display of the webpage.

Content region 520 may represent any information received from the website. In particular, content region 520 may include any media asset, text, video or images of the webpage. In some embodiments, the amount of the webpage that is displayed in display 500A may be limited by the physical display properties of user equipment 300. Accordingly, only a portion of the entire webpage may be presented in display 500A. For example, if the webpage includes 20 pictures, only 5 of the 20 pictures may be shown at any given time. As such, content region 520 may only show 5 of the 20 pictures and as the user navigates down using scroll region 540, other pictures from the 20 are revealed while the 5 that were shown are removed.

In some embodiments, content region 520 may include a video that is automatically played (e.g., is played back without user input) when the webpage is first opened, loaded or displayed. The video in content region 520 may be in a part of the webpage that is not in the current display (e.g., because of the physical limitations of the display device). Despite the video not being shown, the video continues to be played and audio of the video is output for the user to hear. In some implementations, scroll region 540 may include a media asset indicator 546 that identifies for the user where along the webpage (e.g., in what position) the media asset is for which audio is currently being output. Using indicator 546, the user is able to instruct the media guidance application to navigate directly or indirectly to the currently playing video. For example, the user may instruct the media guidance application to gradually scroll down from the currently position 544 to a position corresponding to indicator 546. The user may input these instructions by pressing a down arrow (e.g., using an arrow presented on the display or a physical button on an input device) one or more times until the position corresponding to indicator 546 is reached. Alternatively, the user may select indicator 546 to instruct the media guidance application to directly display the portion of the webpage that includes the video for which audio is being output. For example, the user may click on the region where indicator 546 is shown thereby instructing the media guidance application to scroll down to the position where the media asset for which audio is being output is shown.

Although scroll region 540 is shown as a vertical bar, any other type of scroll region may be provided. For example, scroll region 540 may include a horizontal bar, vertical bar or any combination thereof to enable a user to navigate to different parts of the content navigation page.

In some embodiments, after opening, loading or displaying the webpage and automatically playing back a media asset that may or may not be in the current display, the media guidance application may adjust the volume of the automatically played media asset based on a navigation distance to the media asset. In particular, the media guidance application may measure a distance 542 between a current position 544 and indicator 546 of the media asset currently being played (e.g., the automatically played media asset) in the webpage. The distance may be measured as a percentage of the area in scroll region 540 between where a center of the current scroll position 544 is and a center of the media asset video (e.g., indicator 546). The media guidance application may cross-reference the database of volume levels associated with navigation distances stored in storage 308 to identify a volume level corresponding to the measured distance. The media guidance application may set the volume level of the media asset that is output to correspond to the identified volume level. In some implementations, the media guidance application may present the current volume level in a volume window 530.

In some implementations, the media guidance application may measure distance 542 by computing a length between current position 544 and indicator 546. The length may be expressed in any units, such as millimeters, centimeters, feet, or any other unit of measure. The media guidance application may measure a total length of scroll region 540. The media guidance application may compute a ratio of the measured length between current position 544 and indicator 546 with the measured length of scroll region 540. The media guidance application may cross-reference the computed ratio with the database of volume levels associated with navigation distances to identify and retrieve a corresponding volume level. For example, the media guidance application may compute the ratio to be 60 percent and determine that this ratio corresponds to a 20 percent volume level. Accordingly, the media guidance application may set the volume level of the media asset being played (that may or may not be in the current display) to be 20 percent and present that level in window 530.

In some implementations, the media guidance application may measure distance 542 by computing how many user inputs (e.g., down navigation commands, up navigation commands, left/right navigation commands) are required to navigate from current position 544 to a portion of the webpage that is showing the media asset for which audio is being output. The user inputs may be expressed in any type of identical command that has to be provided multiple times to reach a given point in the content navigation page. For example, the media guidance application may determine that four down navigation commands and one right navigation command are needed to be received from the user to reach the point in the webpage where the media asset is being shown (e.g., to cause the media asset being played to be displayed). As such, the media guidance application may determine that five total user inputs are necessary to navigate from current position 544 to the portion of the webpage that is showing the media asset for which audio is being output. The media guidance application may cross-reference the computed number of user inputs with the database of volume levels associated with navigation distances to identify and retrieve a corresponding volume level. For example, the media guidance application may compute the total number to be 5 and determine that this number corresponds to a 20 percent volume level. Accordingly, the media guidance application may set the volume level of the media asset being played (that may or may not be in the current display) to be 20 percent and present that level in window 530.

In some embodiments, the media guidance application may receive input from the user requesting that the media guidance application navigate to another part of the webpage. For example, the media guidance application may receive a command from the user to navigate down in the webpage (e.g., by way of a user selection of an on-screen or physical down arrow). In response to receiving the user command to navigate to another portion of the webpage (e.g., to cause another portion of the webpage to be displayed), the media guidance application may present content 524 of the webpage in display 500B (FIG. 5B). As shown in display 500B, content 524 is different from content 520 which was displayed as part of a different portion of the webpage in display 500A. In addition, the media guidance application may update scroll region 540 to reflect the new current position 570 in the content navigation page that is being displayed.

In some implementations, content 524 includes a display of the media asset 560 for which audio was being output when display 500A was being shown. Media asset 560 may correspond to the media asset that was automatically played when the webpage was loaded and displayed. In response to receiving the user request to navigate to another portion of the content navigation page, the media guidance application may recompute the navigation distance between the current position in the content navigation page and the position of the media asset for which audio is being output in the content navigation page. In particular, the media guidance application may compute a navigation distance between position 570 and indicator 546. This computation may be performed in a similar manner as discussed above in connection with FIG. 5A.

The media guidance application may cross-reference the computed navigation distance with the database of volume levels associated with navigation distances to identify and retrieve a corresponding volume level. For example, the media guidance application may compute the distance to be 1 user input or a ratio of 10 percent and determine that this distance corresponds to an 80 percent volume level. Accordingly, the media guidance application may set the volume level of the media asset being played (that may or may not be in the current display) to be 80 percent and present that level in window 530. In particular, since the user has navigated to a position in the content navigation page that is closer to the media asset for which audio is being output (e.g., navigated from the position shown in display 500A to the position shown in display 500B), the media guidance application may increase the volume level of the audio being output. Similarly, when the user navigates to a position in the content navigation page that is farther away from the media asset for which audio is being output (e.g., navigates from the position shown in display 500B to the position shown in display 500A), the media guidance application may decrease the volume level of the audio being output.

In some embodiments, the media guidance application may generate a display of a content navigation page that includes media asset listings. For example, the content navigation page may include media asset listings as discussed above in connection with FIG. 1 and/or FIG. 2. The media asset listings may include a media asset listing that may or may not be in the current page display of the content navigation page. Independently of whether or not the media asset listing is shown in the page, audio of the media asset corresponding to the media asset listing may be output. The media guidance application may adjust the volume level of the media asset audio based on a current position the user is viewing in the content navigation page relative to a position in the content navigation page of the media asset listing. In particular, as the user navigates closer to the media asset listing to bring the media asset listing into the display, the media guidance application may increase the volume level of the corresponding media asset for which audio is being output, for example, from 20 percent to 80 percent. As the user navigates farther away from the media asset listing corresponding to the media asset for which audio is being output, the media guidance application may decrease or reduce the volume level of the corresponding media asset, for example, from 80 percent to 20 percent.

Figure 6A:
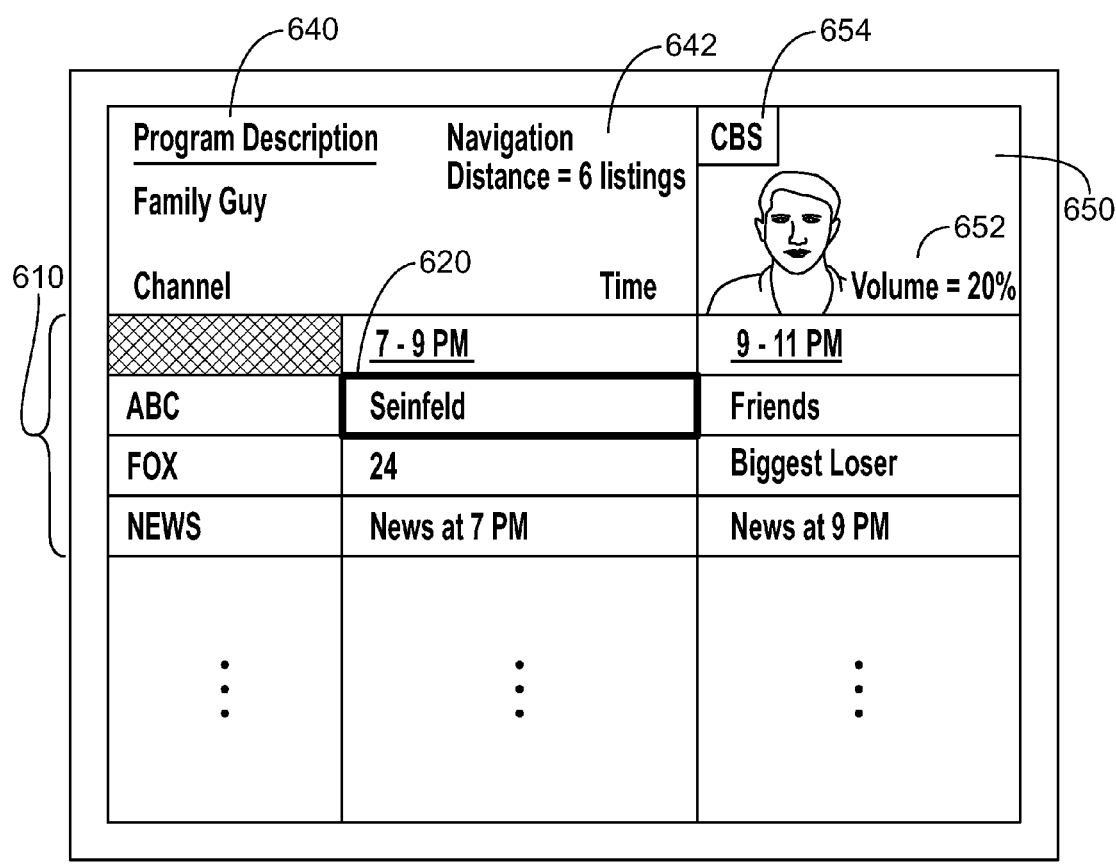

FIGS. 6A and 6B are diagrams of interactive content navigation page displays 600A and 600B in accordance with some embodiments of the disclosure. Interactive content navigation page displays 600A and 600B may represent a media listings page of the media guidance application the user navigated to using user equipment 300. In some embodiments, display 500A may include a grid display 610, media asset description region 640, and a video region 650. Grid display 610 may include content sources and media asset listings. The functionality of grid display 610 is similar to the functionality of display 100 discussed above in connection with FIG. 1 and for the sake of brevity will not be discussed.

Media asset description region 640 may represent information for one or more user or non-user selected media asset listings. In some embodiments, media asset description region 640 may correspond to the media asset for which video is being presented in video region 650. The video presented in region 650 may correspond to the video that is received from the last content source the user accessed before instructing the media guidance application to generate and display the content navigation page. For example, region 650 may present video of the channel to which user equipment 300 is currently tuned. In some embodiments, the amount of media asset listings that are displayed in display 600A may be limited by the physical display properties of user equipment 300. Accordingly, only a portion of the entire media asset listings that are stored may be presented in display 600A. For example, if the total number of media asset listings includes 20 media asset listings, only 5 of the 20 media asset listings may be shown at any given time. As such, display 610 may only show 5 of the 20 media asset listings and as the user navigates down or up, other media asset listings from the 20 are revealed while the 5 that were shown are removed.

In some embodiments, region 650 may include a video that is automatically played (e.g., is played back without user input) when the content navigation page is first opened, loaded or displayed. The video in content region 650 may correspond to a media asset listing that is not in the current display 610 of media asset listings (e.g., because of the physical limitations of the display device). Despite the video being shown and audio of the video being output for the user to hear, the media asset listing of the video is not shown. In some implementations, a navigate to current button (not shown) may enable the user is to instruct the media guidance application to navigate directly or indirectly to the media asset listing for the currently playing video shown in region 650. For example, the user may instruct the media guidance application to gradually scroll down from the current position (e.g., the position identified by a cursor 620) to a position corresponding to the media asset listing for the currently playing video. The user may input these instructions by pressing a down arrow (e.g., using an arrow presented on the display or a physical button on an input device) one or more times until the position corresponding to the media asset listing for the currently playing video is reached. Each time the user presses a down arrow cursor 620 is moved to the next adjacent media asset listing underneath a currently highlighted media asset listing (e.g., from "Seinfeld" listing to "24" listing). Alternatively, the user may select the navigate to current button to instruct the media guidance application to directly display the portion of grid display 610 that includes the media asset listing for the video for which audio is being output.

In some embodiments, after opening, loading or displaying grid display 610 (e.g., the content navigation page) and automatically playing back a media asset that may or may not be in the current display (e.g., playing the video shown in region 650), the media guidance application may adjust the volume of the automatically played media asset based on a navigation distance to the media asset listing corresponding to the currently playing video. In particular, the media guidance application may measure a distance 642 between a current position identified by cursor 620 and a media asset listing corresponding to the media asset currently being played (e.g., the automatically played media asset) in grid display 610.

In some implementations, the media guidance application may measure distance 642 by computing a length between the current position and the media asset listing for the media asset currently being played. The length may be expressed in any units, such as number of listings between the currently highlighted listing and the media asset listing corresponding to the media asset, millimeters, centimeters, feet, or any other unit of measure. The media guidance application may count how many media asset listings are between the currently highlighted listing and the media asset listing corresponding to the media asset. The media guidance application may cross-reference the computed number with the database of volume levels associated with navigation distances to identify and retrieve a corresponding volume level. For example, the media guidance application may compute the number to be 6 media asset listings (or rows of media asset listings) and determine that this number corresponds to a 20 percent volume level. Accordingly, the media guidance application may set the volume level of the media asset being played (that may or may not be in the current display) to be 20 percent and present that level in region 650 as indicator 652.

In some implementations, the media guidance application may measure distance 642 by computing how many user inputs (e.g., down navigation commands, up navigation commands, left/right navigation commands) are required to navigate from the current position to a portion of grid display 610 that includes the media asset corresponding to the media asset for which audio is being output. The user inputs may be expressed in any type of identical command that has to be provided multiple times to reach a given point in the content navigation page. For example, the media guidance application may determine that four down navigation commands are needed to be received from the user to reach the point in grid display 610 where the media asset listing is being shown. As such, the media guidance application may determine that four total user inputs are necessary to navigate from the current position to the portion of grid display 610 that is showing the media asset listing for which audio is being output. The media guidance application may cross-reference the computed number of user inputs with the database of volume levels associated with navigation distances to identify and retrieve a corresponding volume level. For example, the media guidance application may compute the total number to be 4 and determine that this number corresponds to a 20 percent volume level. Accordingly, the media guidance application may set the volume level of the media asset being played (that may or may not be in the current display) to be 20 percent and present that level as indicator 652.

In some embodiments, the media guidance application may receive input from the user requesting that the media guidance application navigate to another part of grid display 610. For example, the media guidance application may receive a command from the user to navigate down in grid display 610 (e.g., by way of a user selection of an on-screen or physical down arrow). In response to receiving the user command to navigate to another portion of grid display 610 (e.g., to cause another portion of grid display 610 to be displayed), the media guidance application may present other media asset listings of grid display 610 in display 600B (FIG. 6B). As shown in display 600B, the media asset listings are different from the media asset listings which were displayed as part of a different portion of grid display 610 in display 600A. In addition, the media guidance application may update cursor 620 to reflect the new current position in the content navigation page that is being displayed.

In some implementations, the portion of grid display 620 to which the user navigated includes a display of the media asset listing 680 for which audio was being output when display 600A was being shown. Media asset listing 680 may correspond to the media asset that was automatically played when grid display 610 was loaded and displayed. As shown, media asset listing 680 corresponds to the media asset shown in region 650. Specifically, the media asset listing is provided by content source "CBS" which is the same content source indicated in content source indicator 654 in region 650. In response to receiving the user request to navigate to another portion of the content navigation page, the media guidance application may recompute the navigation distance between the current position in the content navigation page and the position of the media asset listing for which audio is being output in the content navigation page. In particular, the media guidance application may compute a navigation distance between the current position of cursor 620 (e.g., the media asset listing "Sex and The City") and the media asset listing for "Family Guy" (e.g., the listing corresponding to the video shown in region 650). This computation may be performed in a similar manner as discussed above in connection with FIG. 6A.

The media guidance application may cross-reference the computed navigation distance with the database of volume levels associated with navigation distances to identify and retrieve a corresponding volume level. For example, the media guidance application may compute the distance 644 to be 1 media asset listing percent and determine that this distance corresponds to a 60 percent volume level. Accordingly, the media guidance application may set the volume level of the media asset being played (that may or may not be in the current display) to be 60 percent and present that level in indicator 660. In particular, since the user has navigated to a position in the content navigation page that is closer to the media asset listing for which audio is being output (e.g., navigated from the position shown in display 600A to the position shown in display 600B), the media guidance application may increase the volume level of the audio being output, for example, from 20 percent to 60 percent. Similarly, when the user navigates to a position in the content navigation page that is farther away from the media asset for which audio is being output (e.g., navigates from the position shown in display 600B to the position shown in display 600A), the media guidance application may decrease the volume level of the audio being output, for example, from 60 percent to 20 percent.

Figure 7:
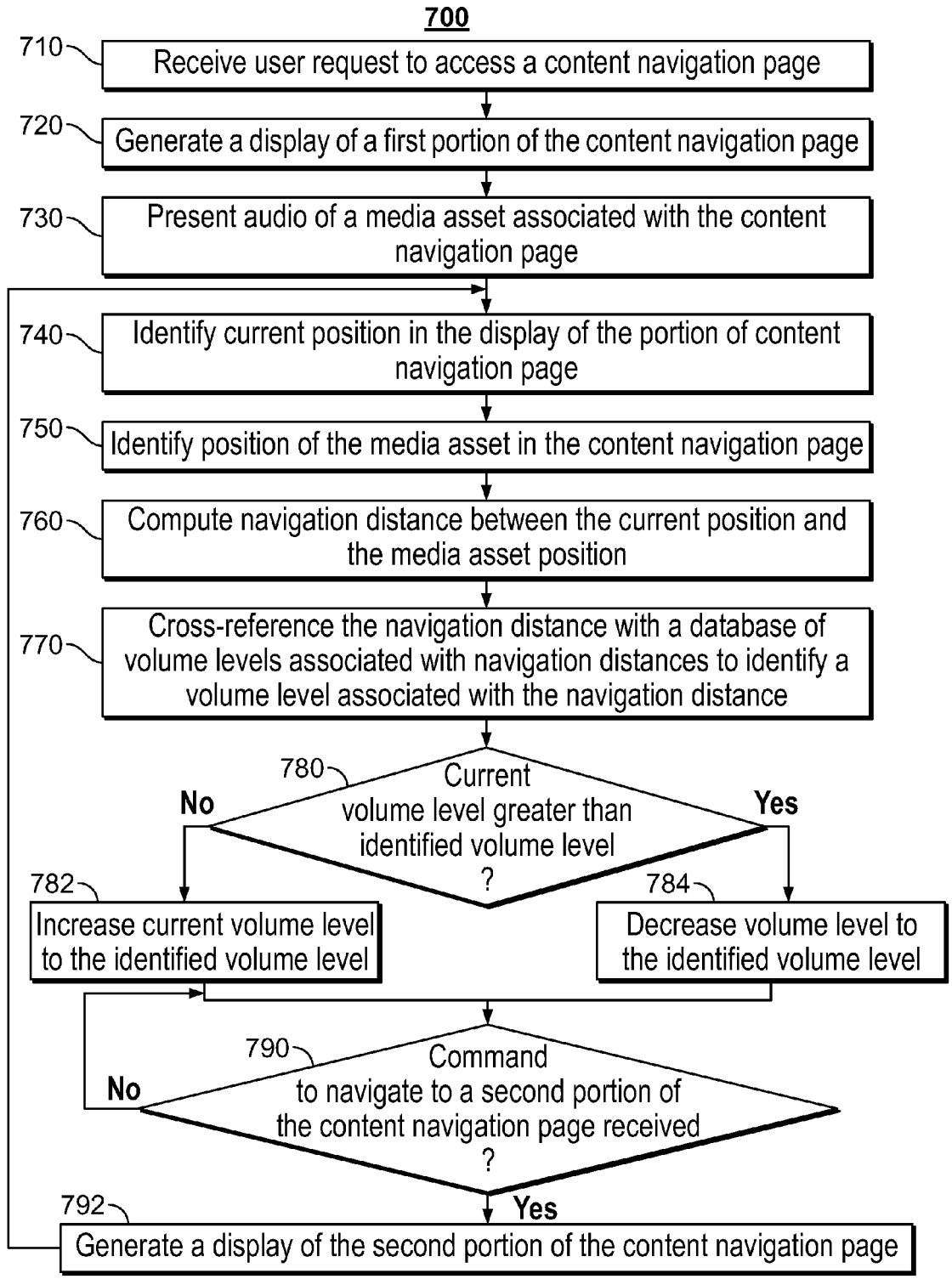

FIG. 7 is a flow diagram describing the process 700 of automatically adjusting volume of a media asset based on navigation distance in accordance with some embodiments of the disclosure. At step 710, a user request to access a content navigation page is received. For example, the media guidance application may receive a user entry of an address, such as a URL, in address field 510 of a webpage or web browser. In some implementations, the media guidance application may receive a user input, such as a display guide command. In such circumstances, the media guidance application may generate a display of a plurality of media asset listings.

At step 720, a display of a first portion of the content navigation page may be generated. For example, the media guidance application may receive a webpage from a website and display contents 520 of the received webpage (FIG. 5A). In some implementations, the media guidance application may present a first plurality of media asset listings in display 610 (FIG. 6A).

At step 730, audio of a media asset associated with the content navigation page may be presented. For example, the media guidance application may automatically play a video in response to accessing a webpage (FIG. 5A). The video may or may not be included in the portion of the webpage that is displayed but audio of the video may be output. In some implementations, a video may be presented by the media guidance application in region 650 and the corresponding audio may be output (FIG. 6A).

At step 740, a current position in the display of the portion of the content navigation page is identified. For example, the media guidance application may identify a current position 544 in the webpage using scroll region 540 (FIG. 5A). In some implementations, the media guidance application may identify which media asset listing is being identified by cursor 620 in display 600A as the current position (FIG. 6A).

At step 750, a position of the media asset in the content navigation page is identified. For example, the media guidance application may identify a position in scroll region 544 that corresponds to the display of the media asset in the webpage (FIG. 5A). In some implementations, the media guidance application may identify a relative position of a media asset listing corresponding to the video presented in region 650 (FIG. 6A).

At step 760, a navigation distance between the current position and the media asset position is computed. For example, the media guidance application may measure a percentage of scroll region 540 that is occupied between the current position 544 and the position of the media asset in the webpage identified by indicator 546. In some embodiments, the media guidance application may compute the percentage as a ratio of the length between position 544 and indicator 546 and the length of scroll region 540. In some embodiments, the media guidance application may compute the navigation distance as a function of the number of user inputs required to reach the media asset from the current position (e.g., how many times the user has to press a particular navigation button or set of navigation buttons). In some embodiments, the media guidance application may compute the navigation distance as a function of the number of listings between the current media asset listing that is highlighted by cursor 620 and the media asset listing corresponding to the media asset for which the audio is being output.

At step 770, the navigation distance is cross-referenced with a database of volume levels associated with navigation distances to identify a volume level associated with the navigation distance. For example, the media guidance application may generate an SQL query for transmission to a local or remote database that includes the database of volume levels. The SQL query may include a measure or number representing the navigation distance. The database may return to the media guidance application the identified volume level that is associated with the specified navigation distance.

At step 780, a determination is made as to whether the current volume level is greater than the identified volume level. In response to determining that the current volume level is not greater than the identified volume level, the process proceeds to step 782, otherwise the process proceeds to step 784. For example, the media guidance application may compare the volume level of the audio of the media asset currently being output to the identified volume level.

At step 782, the current volume level is increased to the identified volume level.

At step 784, the current volume level is decreased to the identified volume level.

At step 790, a determination is made as to whether a command to navigate to a second portion of the content navigation page has been received. In response to determining that the command to navigate to a second portion has been received, the process proceeds to step 792, otherwise the process proceeds to step 790. For example, the media guidance application may determine whether the user input a navigation command (e.g., page down, down arrow, up arrow, page up, scroll down, scroll up, hyperlink selection, or any other suitable navigation command).

At step 792, a display of the second portion of the content navigation page is generated. For example, the media guidance application may navigate the user to the bottom of the webpage that includes the display of the media asset being automatically played back (FIG. 5B). In some implementations, the media guidance application may navigate the user to a second plurality of media asset listings (FIG. 6B).

FIG. 8 is a flow diagram describing the process 800 of automatically adjusting volume of a media asset based on navigation distance in accordance with some embodiments of the disclosure. At step 810, a user request to access a content navigation page is received. For example, the media guidance application may receive a user entry of an address, such as a URL, in address field 510 of a webpage or web browser. In some implementations, the media guidance application may receive a user input, such as a display guide command. In such circumstances, the media guidance application may generate a display of a plurality of media asset listings.

At step 820, a display of a first portion of the content navigation page may be generated. For example, the media guidance application may receive a webpage from a website and display contents 520 of the received webpage (FIG. 5A). In some implementations, the media guidance application may present a first plurality of media asset listings in display 610 (FIG. 6A).

At step 830, audio of a media asset associated with the content navigation page may be presented. For example, the media guidance application may automatically play a video in response to accessing a webpage (FIG. 5A). The video may or may not be included in the portion of the webpage that is displayed but audio of the video may be output. In some implementations, a video may be presented by the media guidance application in region 650 and the corresponding audio may be output (FIG. 6A).

At step 850, a navigation distance between a current position and a media asset position is computed. For example, the media guidance application may measure a percentage of scroll region 540 that is occupied between the current position 544 and the position of the media asset in the webpage identified by indicator 546. In some embodiments, the media guidance application may compute the percentage as a ratio of the length between position 544 and indicator 546 and the length of scroll region 540. In some embodiments, the media guidance application may compute the navigation distance as a function of the number of user inputs required to reach the media asset from the current position (e.g., how many times the user has to press a particular navigation button or set of navigation buttons). In some embodiments, the media guidance application may compute the navigation distance as a function of the number of listings between the current media asset listing that is highlighted by cursor 620 and the media asset listing corresponding to the media asset for which the audio is being output.

At step 860, the current volume is set to the identified volume. For example, the media guidance application may adjust the volume level of the audio of the media asset being output to the identified volume level.

At step 870, a determination is made as to whether a command to navigate to a second portion of the content navigation page has been received. In response to determining that the command to navigate to a second portion has been received, the process proceeds to step 880, otherwise the process proceeds to step 870. For example, the media guidance application may determine whether the user input a navigation command (e.g., page down, down arrow, up arrow, page up, scroll down, scroll up, hyperlink selection, or any other suitable navigation command).

At step 880, a display of the second portion of the content navigation page is generated. For example, the media guidance application may navigate the user to the bottom of the webpage that includes the display of the media asset being automatically played back (FIG. 5B). In some implementations, the media guidance application may navigate the user to a second plurality of media asset listings (FIG. 6B).

At step 890, a determination is made as to whether the second portion of the content navigation page is closer to the portion of the content navigation page that includes the media asset. In response to determining that the second portion is closer, the process proceeds to step 892, otherwise the process proceeds to step 894.

At step 892, the current volume level of the audio corresponding to the media asset is changed in a first direction. For example, the media guidance application may increase the volume level of the audio corresponding to the media asset. Alternatively, the media guidance application may decrease the volume level of the audio corresponding to the media asset.

At step 894, the current volume level of the audio corresponding to the media asset is changed in a second direction. For example, the media guidance application may decrease the volume level of the audio corresponding to the media asset. Alternatively, the media guidance application may increase the volume level of the audio corresponding to the media asset.

It should be understood that the above steps of the flow diagram of FIGS. 7 and 8 may be executed or performed in any order or sequence not limited to the order and sequence shown and described in the figures. Also, some of the above steps of the flow diagrams of FIGS. 7 and 8 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A method for automatically adjusting volume of a media asset based on navigation distance, the method comprising:
    in response to receiving a user request for a navigation page, generating a display of the content navigation page, wherein the content navigation page is associated with a media asset;
    determining a navigation distance from a current position in the content navigation page to the media asset within the content navigation page;
    storing a database of volume levels associated with navigation distances;
    searching the stored database to identify a navigation distance that corresponds to the determined navigation distance;
    retrieving from the stored database a volume level that is associated with the identified navigation distance; and
    in response to receiving the user request for the navigation page, causing audio of the media asset to be presented at the retrieved volume level prior to presenting a representation of the media asset when the display of the content navigation page is generated.

2. The method of claim 1, wherein the content navigation page includes a plurality of media asset listings including a media asset listing for the media asset, and wherein the media asset listing is included in a portion of the content navigation page that is not currently displayed.

3. The method of claim 1, wherein the content navigation page includes a webpage, and wherein the media asset includes a promotion that is included in a portion of the webpage not currently being displayed.

4. The method of claim 1, wherein determining the navigation distance comprises:
identifying, as the current position, a first position of a cursor on the content navigation page;
identifying a second position of the media asset in the content navigation page; and
computing a distance between the first position and the second position.

5. The method of claim 4, wherein the second position corresponds to a media asset listing associated with the media asset, and wherein computing the distance comprises determining how many navigation commands are needed to reach the second position from the first position.

6. The method of claim 1, wherein the display of the content navigation page includes a first portion of the content navigation page that does not include a display of the media asset, further comprising:
in response to receiving input from the user, navigating from the current position to a second portion of the content navigation page that includes a display of at least a portion of the media asset;
generating a display of the second portion of the content navigation page with the at least the portion of the media asset; and
causing audio of the media asset to be presented at a different volume level that is greater than the retrieved volume level.

7. The method of claim 6, wherein the determined navigation distance is a first determined navigation distance, and wherein the identified navigation distance is a first identified navigation distance, further comprising:
determining a second navigation distance to the media asset within the content navigation page in response to receiving the input from the user;
searching the stored database to identify a second navigation distance that corresponds to the second determined navigation distance; and
retrieving, from the stored database, the different volume level in response to determining that the different volume level is associated with the second identified navigation distance.

8. The method of claim 1, wherein the display of the content navigation page includes a first portion of the content navigation page that includes a display of the media asset, further comprising:
in response to receiving input from the user, navigating from the current position to a second portion of the content navigation page that does not include a display of the media asset;
generating a display of the second portion of the content navigation page; and
causing audio of the media asset to be presented at a different volume level that is less than the retrieved volume level.

9. The method of claim 1 further comprising:
in response to receiving input from the user, navigating from the current position to a second position of the display of the content navigation page that does not include a display of the media asset; and
causing audio of the media asset to be presented at a different volume level than the retrieved volume level based on a difference in navigation distance to the media asset between the current position and the second position.

10. The method of claim 1, wherein volume level of audio of the media asset is automatically adjusted as the user navigates within the content navigation page.

11. A system for automatically adjusting volume of a media asset based on navigation distance, the system comprising:
storage device circuitry configured to store a database of volume levels associated with navigation distances; and
control circuitry configured to:
in response to receiving a user request for a navigation page, generate a display of the content navigation page, wherein the content navigation page is associated with a media asset;
determine a navigation distance from a current position in the content navigation page to the media asset within the content navigation page;
search the stored database to identify a navigation distance that corresponds to the determined navigation distance;
retrieve from the stored database a volume level that is associated with the identified navigation distance; and
in response to receiving the user request for the navigation page, cause audio of the media asset to be presented at the retrieved volume level prior to presenting a representation of the media asset when the display of the content navigation page is generated.

12. The system of claim 11, wherein the content navigation page includes a plurality of media asset listings including a media asset listing for the media asset, and wherein the media asset listing is included in a portion of the content navigation page that is not currently displayed.

13. The system of claim 11, wherein the content navigation page includes a webpage, and wherein the media asset includes a promotion that is included in a portion of the webpage not currently being displayed.

14. The system of claim 11, wherein the control circuitry is further configured to:
identify, as the current position, a first position of a cursor on the content navigation page;
identify a second position of the media asset in the content navigation page; and
compute a distance between the first position and the second position.

15. The system of claim 14, wherein the second position corresponds to a media asset listing associated with the media asset, and wherein the control circuitry is further configured to determine how many navigation commands are needed to reach the second position from the first position.

16. The system of claim 11, wherein the display of the content navigation page includes a first portion of the content navigation page that does not include a display of the media asset, and wherein the control circuitry is further configured to:
in response to receiving input from the user, navigate from the current position to a second portion of the content navigation page that includes a display of at least a portion of the media asset;
generate a display of the second portion of the content navigation page with the at least the portion of the media asset; and cause audio of the media asset to be presented at a different volume level that is greater than the retrieved volume level.

17. The system of claim 16, wherein the navigation distance is a first navigation distance, and wherein the identified navigation distance is a first identified navigation distance, and wherein the control circuitry is further configured to:
determine a second navigation distance to the media asset within the content navigation page in response to receiving the input from the user;
search the stored database to identify a second navigation distance that corresponds to the second determined navigation distance; and
retrieve, from the stored database, the different volume level in response to determining that the different volume level is associated with the second identified navigation distance.

18. The system of claim 11, wherein the display of the content navigation page includes a first portion of the content navigation page that includes a display of the media asset, and wherein the control circuitry is further configured to:
in response to receiving input from the user, navigate from the current position to a second portion of the content navigation page that does not include a display of the media asset;
generate a display of the second portion of the content navigation page; and
cause audio of the media asset to be presented at a different volume level that is less than the retrieved volume level.

19. The system of claim 11, wherein the control circuitry is further configured to:
in response to receiving input from the user, navigate from the current position to a second position of the display of the content navigation page that does not include a display of the media asset; and
cause audio of the media asset to be presented at a different volume level than the retrieved volume level based on a difference in navigation distance to the media asset between the current position and the second position.

20. The system of claim 11, wherein volume level of audio of the media asset is automatically adjusted as the user navigates within the content navigation page.

21. A method for automatically adjusting volume level of a media asset comprising:
receiving at a user equipment a media asset from a media content source;
in response to receiving a user request for a content navigation page, generating a display of the content navigation page, wherein:
the content navigation page includes the media asset and a plurality of media asset listings,
the media asset corresponds to a media asset listing of the plurality of media asset listings, and
the media asset listing is located in the content navigation page separate from a content region of the media asset;
determining a navigation distance from a position of a currently highlighted media asset listing in the content navigation page to a media asset listing corresponding to the media asset within the content navigation page;
retrieving from a database of volume levels associated with navigation distances a volume level that is associated with the determined navigation distance; and
in response to receiving the user request for the content navigation page, outputting audio of the media asset from the user equipment at the identified volume level prior to presenting a representation of the media asset when the display of the content navigation page is generated.

22. A system for automatically adjusting volume level of a media asset, the system comprising:
storage device circuitry configured to store a database of volume levels associated with navigation distances; and
control circuitry configured to:
receive at a user equipment a media asset from a media content source;
in response to receiving a user request for a content navigation page, generate a display of the content navigation page, wherein:
the content navigation page includes the media asset and a plurality of media asset listings,
the media asset corresponds to a media asset listing of the plurality of media asset listings, and
the media asset listing is located in the content navigation page separate from a content region of the media asset;
determine a navigation distance from a position of a currently highlighted media asset listing in the content navigation page to a media asset listing corresponding to the media asset within the content navigation page;
retrieve, from the stored database, a volume level that is associated with the determined navigation distance; and
in response to receiving the user request for the content navigation page, output audio of the media asset from the user equipment at the identified volume level prior to presenting a representation of the media asset when the display of the content navigation page is generated.

* * * * *